(12) United States Patent
Kim et al.

(10) Patent No.: US 9,231,431 B2
(45) Date of Patent: Jan. 5, 2016

(54) INTEGRATED CIRCUIT FOR WIRELESS CHARGING AND OPERATING METHOD THEREOF

(71) Applicant: Samsung Electronics Co., Ltd., Gyeonggi-do (KR)

(72) Inventors: Yu-Su Kim, Gyeonggi-do (KR); Se-Ho Park, Gyeonggi-do (KR); Kyung-Woo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 201 days.

(21) Appl. No.: 14/104,001

(22) Filed: Dec. 12, 2013

(65) Prior Publication Data

US 2014/0159655 A1 Jun. 12, 2014

(30) Foreign Application Priority Data

Dec. 12, 2012 (KR) .................. 10-2012-0144794
Nov. 19, 2013 (KR) .................. 10-2013-0140955

(51) Int. Cl.
*H02J 7/00* (2006.01)
*H02J 7/02* (2006.01)

(52) U.S. Cl.
CPC .................................... *H02J 7/025* (2013.01)

(58) Field of Classification Search
CPC ...................................................... H02J 7/025
USPC ........................................................ 320/108
See application file for complete search history.

(56) References Cited

U.S. PATENT DOCUMENTS

| 2009/0279511 | A1 | 11/2009 | Zhu |
| 2011/0051601 | A1 | 3/2011 | Linsky et al. |
| 2011/0205986 | A1 | 8/2011 | Medapalli |
| 2011/0316754 | A1 | 12/2011 | Nam et al. |

FOREIGN PATENT DOCUMENTS

| KR | 100949832 | 3/2010 |
| KR | 1020110000696 | 1/2011 |
| KR | 101034043 | 5/2011 |
| KR | 1020120000908 | 1/2012 |
| KR | 1020120117974 | 10/2012 |
| KR | 1020120123565 | 11/2012 |

*Primary Examiner* — Edward Tso
*Assistant Examiner* — Ahmed Omar
(74) *Attorney, Agent, or Firm* — The Farrell Law Firm, P.C.

(57) ABSTRACT

An integrated circuit for wireless charging and a wireless charging method in an integrated circuit are provided. The integrated circuit includes a first wireless communication unit configured to support a first wireless communication method; a second wireless communication unit configured to support a second wireless communication method; a first route selection unit configured to perform a selection from among a first power input according to wired charging and a second power input according to wireless charging to be allowed as input; a second route selection unit configured to perform a selection from among a power between a third power input from a battery and a fourth power input according to wireless charging to be allowed as input; a power block configured to receive the power from any the first and second route selection units; and a controller configured to control an operation of the first and second route selection units.

16 Claims, 12 Drawing Sheets

US 9,231,431 B2

INTEGRATED CIRCUIT FOR WIRELESS CHARGING AND OPERATING METHOD THEREOF

PRIORITY

This application claims priority under 35 U.S.C. §119(a) to Korean Application Serial Nos. 10-2012-0144794 & 10-2013-0140955, which were filed in the Korean Intellectual Property Office on Dec. 12, 2012 & Nov. 19, 2013, the entire content of each of which is incorporated herein by reference.

BACKGROUND OF THE INVENTION

1. Field of the Invention

The present invention relates to wireless charging, and more specifically, to a Wi-Fi/Bluetooth combo Integrated Circuit that can be applied in a wireless charging field.

2. Description of the Related Art

Bluetooth Low Energy (BLE) standards have been recently determined to be employed for signaling in Alliance for Wireless Power (A4WP) in relation to the resonance type wireless charging technology. Accordingly, a BLE (e.g., Bluetooth (BT) 4.0 standards) single Integrated Circuit (IC) or a Wi-Fi/BT 4.0 combo IC may be used according to user's preference, as long as the signaling follows the BLE standards.

However, an interface (I/F) of existing Wi-Fi/BT combo ICs are too complex to be used in signaling for wireless charging. The Wi-Fi/BT combo IC is dominated by an Application Processor (AP). However, when performing wireless charging, control operations are performed and data is transmitted/received in an order of control operations performed by the AP, the Wi-Fi/BT combo IC, and a wireless charging power IC.

FIG. 1 is a diagram illustrating a structure of a conventional terminal having a wireless charging device. Referring to FIG. 1, when the wireless charging device is installed within a terminal 10 such that a back cover 15 having a resonator 14 therein is mounted to the terminal 10, a separate Integrated Circuit (IC) (i.e., a BLE unit IC 16 or a Wi-Fi/BT combo IC 17) is used for BLE signaling.

FIG. 2 is a diagram illustrating a structure of another conventional terminal having a wireless charging device. As illustrated in FIG. 2, an existing Wi-Fi/BT combo IC 19 employed for a terminal 20 may be embedded in the terminal 20 and used instead of a BLE unit IC 18. When the Wi-Fi/BT combo IC 19 is used, wireless charging cannot be performed in a state in which the terminal 20 is turned off regardless of the presence of a back cover 15 having a resonator therein.

In general, in a case of a single combo chip in which Wi-Fi, BT, etc. are implemented, among a Bluetooth core and a Wi-Fi core, the Wi-Fi core operates as a master core. Thus, the Wi-Fi core consuming a large amount of power should be driven for BT and BLE communication. In addition, BT and BLE profiles required for the BT and BLE communication exist in a stack within an Application Processor (AP), and therefore wireless charging through the BT and BLE communication cannot be performed until the AP is driven. Namely, the wireless charging cannot be performed in the dead battery situation in which the AP cannot be driven.

SUMMARY OF THE INVENTION

Aspects of the present invention are provided to address at least the above-mentioned problems and/or disadvantages and to provide at least the advantages described below.

Accordingly, an aspect of the present invention is to provide an integrated circuit for wireless charging and a wireless charging method in an integrated circuit for wireless charging, in which a Wi-Fi/BT combo IC performs signaling during wireless charging, so that wireless charging can be performed even dead battery.

In accordance with an aspect of the present invention, an integrated circuit for wireless charging is provided. The integrated circuit includes a first wireless communication unit configured to support a first wireless communication method; a second wireless communication unit configured to support a second wireless communication method; a first route selection unit configured to perform a selection from among a first power input according to wired charging and a second power input according to wireless charging to be allowed as input; a second route selection unit configured to perform a selection from among a power between a third power input from a battery and a fourth power input according to wireless charging to be allowed as input; a power block configured to receive the power from any the first and second route selection units; and a controller configured to control an operation of the first and second route selection units.

In accordance with another aspect of the present invention, a wireless charging method in an integrated circuit for wireless charging is provided. The wireless charging method includes determining whether there is receipt of at least one of a first power input according to wired charging and a second power input according to wireless charging; performing a selection to allow supply of the first power input according to the wired charging in response to a determination that the first power is input according to the wired charging and the second power is input according to the wireless charging; and performing at least one of wireless network communication and contactless near field wireless communication by receiving the first power input according to the wired charging.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
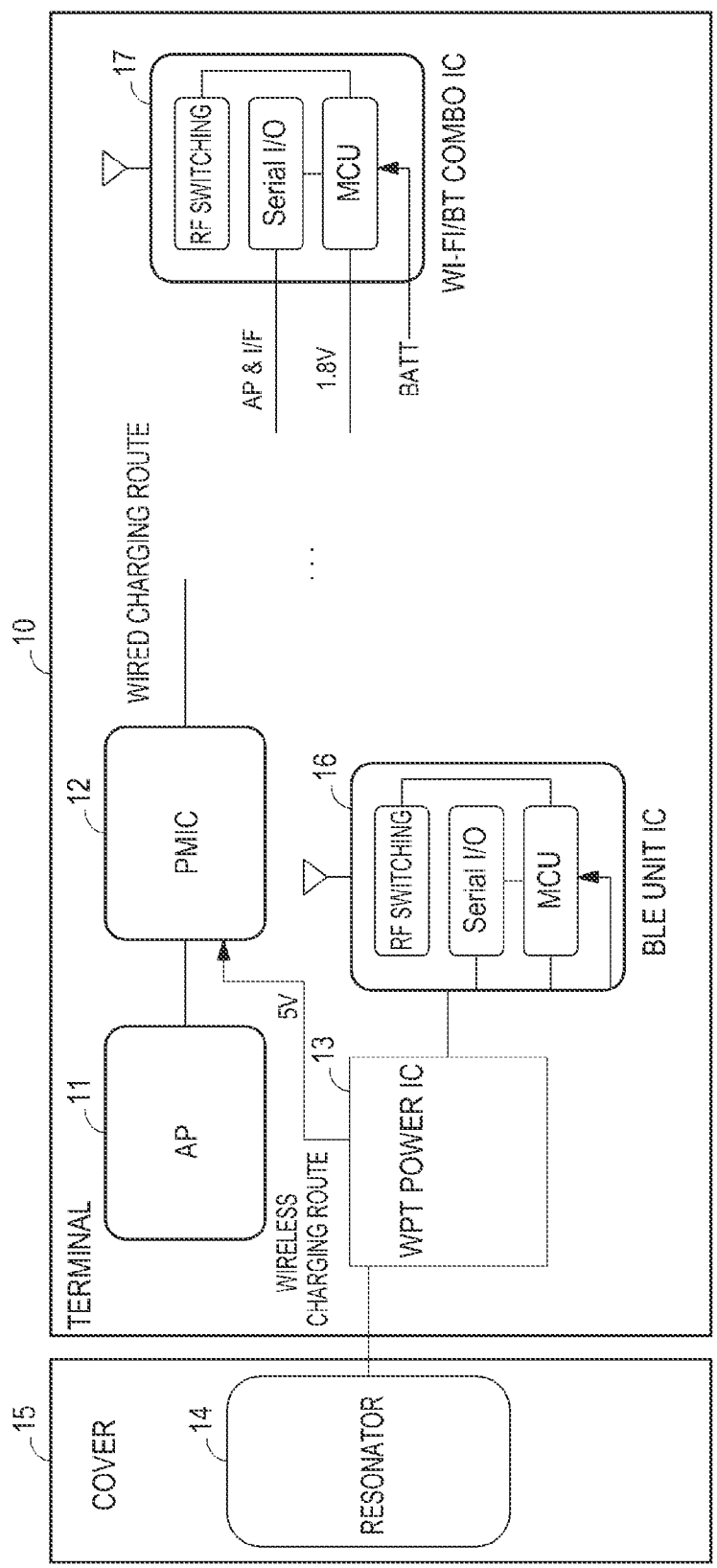
FIG. 1 is a diagram illustrating a structure of a conventional terminal having a wireless charging device.
Figure 2:
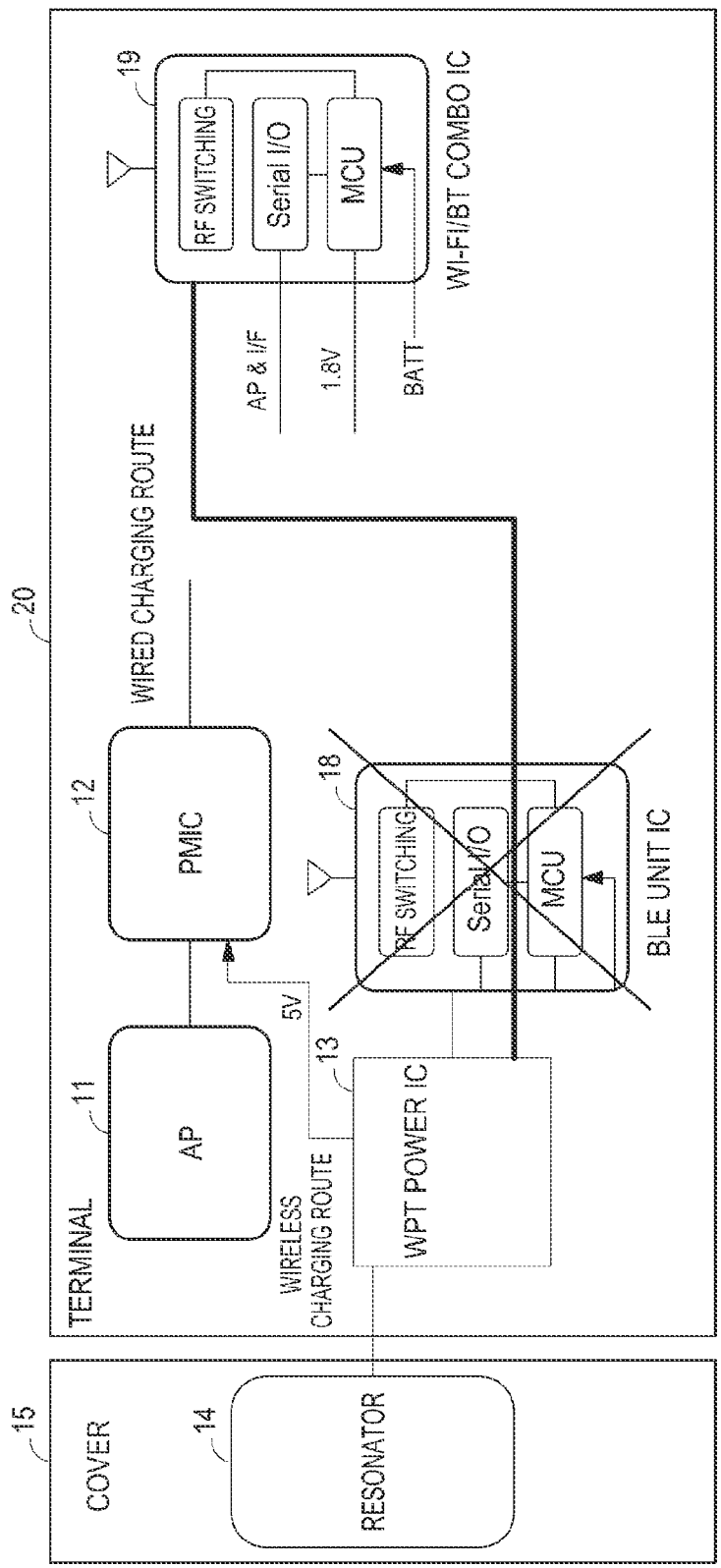
FIG. 2 is a diagram illustrating a structure of another conventional terminal having a wireless charging device.

Embodiments of the present invention are described in detail as follows with reference to the accompanying drawings. Embodiments to the present invention are not limited to particular forms described herein, but include all modifications, equivalents, and alternatives falling within the scope of the invention.

While terms including ordinal numbers, such as "first" and "second," etc., may be used to describe various components herein, such components are not limited by the above terms. The terms herein are used merely used for the purpose distinguishing elements from the other elements. For example, a first element could be termed a second element, and similarly, a second element could be also termed a first element without departing from the scope of the present invention. As used herein, the term "and/or" includes any and all combinations of one or more of the associated listed items.

The terms used in this application are provided for the purpose of describing particular embodiments only and do not limit the invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

According to an embodiment of the present invention, a wireless power receiver is a rechargeable battery powered device. Such a device may be, for example, a terminal, a portable terminal, a mobile terminal, a communication terminal, a portable communication terminal, a portable mobile terminal, or the like. When charging a battery of the wireless power receiver, electrical energy is supplied to the battery through a separate charging device. In general, the charging device and the battery have separate contact terminals, respectively, at respective exteriors thereof and are electrically connected to each other through mutual contact of the contact terminals. A power supplied through the electrical connection may be referred to as wired power. Meanwhile, power supplied through a method in which the battery is automatically charged only if the wireless power receiver is put on a charging pad while not being connected with the separate charging device may be referred to as wireless power.

A mobile phone is described herein as an example of representative configuration of the electronic device according to embodiments of the present invention. Some elements in the representative configuration of such an electronic device may be omitted or changed as needed in accordance with embodiments of the present invention.

Figure 3:
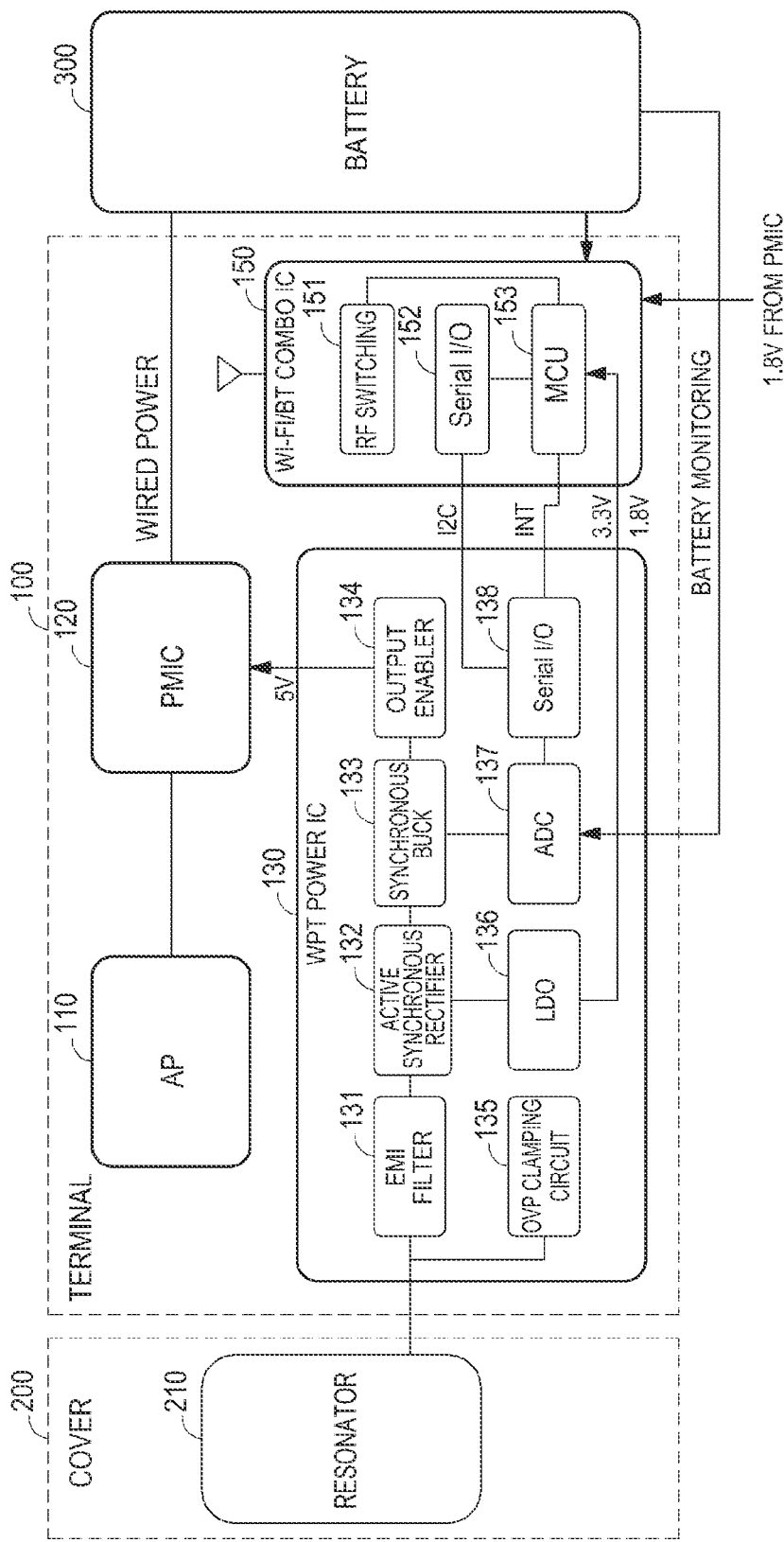
FIG. 3 is a block diagram illustrating a structure of a wireless power receiver having a Wi-Fi/Bluetooth combo Integrated Circuit (IC) therein according to an embodiment of the present invention.

FIG. 3 is a block diagram illustrating a structure of a wireless power receiver having a Wi-Fi/Bluetooth (BT) combo Integrated Circuit (IC) therein according to an embodiment of the present invention. A portable terminal is described herein as representative configuration of the wireless power receiver in FIG. 3, and some elements in the representative configuration of the wireless power receiver may be omitted or changed as needed in accordance with embodiments of the present invention. Referring to FIG. 3, a terminal 100 includes an Application Processor (AP) 110, a Power Management Integrated Circuit (PMIC) 120, a Wireless Power Transfer (WPT) power IC 130, and a Wi-Fi/BT combo IC 150.

A back cover 200 including a resonator 210 is mounted to the terminal 100, and the terminal 100 includes the Wi-Fi/BT combo IC 150 and is connected with a battery 300. Further, the Wi-Fi/BT combo IC 150 is connected with a serial interface (I/F), an interrupt, and a power (e.g., battery 300).

The resonator 210 receives a wireless resonance signal transmitted from a resonance signal generator of a wireless power transmitter (not shown).

The AP 110 may be configured with an integrated control chip (not shown) performing various functions of a Central Processing Unit (CPU), such as data conversion, a memory control, a bus control, etc. The AP 110 also includes (not shown) a non-volatile memory. Data required for low power wireless communication and data (a Wi-Fi profile, etc.) required for wireless network communication, such as Wi-Fi, are stored in the non-volatile memory.

A series of processes performed with respect to the AP 110 is described as follows. First, the AP 110 mounted to the terminal 100 is set to be woken up when a request for power-on is input. Accordingly, when a power-on request is input, the wireless power receiver checks a state of the battery 300 and wakes up the AP 110 when a level of the battery is at least equal to a threshold value.

The PMIC 120 performs both a function of receiving wired power supplied from the battery 300 mounted to the terminal 100 and a function of charging the battery 300 with wireless power received from the wireless power transmitter or a function of transferring the wireless power to a low power wireless communication unit (not shown) within the Wi-Fi/BT combo IC 150.

The WPT power IC 130 includes an Electro-Magnetic Interference (EMI) filter 131, an active synchronous rectifier 132, a synchronous buck 133, an output enabler 134, an Over-Voltage Power (OVP) clamping circuit 135, a Low Drop-Out (LDO) linear regulator 136, an Analog-Digital Converter (ADC) 137, and a serial Input/Output (I/O) 138.

The EMI filter 131 removes noise from the signal received through the resonator 210. The active synchronous rectifier 132 and the LDO 136 rectify Alternating Current (AC) power received through the resonator 210 to Direct Current (DC) power. The synchronous buck 133 supplies power of 5 V for other elements, such as the PMIC 120, for example. As described above, the active synchronous rectifier 132, the synchronous buck 133, and the LDO 136 adjust the battery power and supply the power adjusted in advance as power for the respective elements of the wireless power receiver. Further, the OVP clamping circuit 135 prevents power loss due to power voltage overhead. The serial I/O 138 is connected to a serial I/O 152 of the Wi-Fi/BT combo IC 150 through an Inter-Integrated Circuit (I2C), and is connected to a Micro Controller Unit (MCU) 153 of the Wi-Fi/BT combo IC 150 through a start signal INT.

The Wi-Fi/BT combo IC 150 is a contactless near field wireless communication unit that supports a first wireless communication method and a second wireless communication method. A wireless network function and a low power wireless communication function are illustrated examples of the first and second wireless communication methods. The wireless network function is performed by a Wi-Fi communication unit (not shown), and the low power wireless communication function is performed by a BT communication unit (not shown) and a BLE communication unit (not shown). Here, the Wi-Fi communication unit is connected with a Radio Frequency (RF) switching 151 under the control of the BT communication unit operating as a master in order to connect with an external server or to execute an operation.

Figure 4:
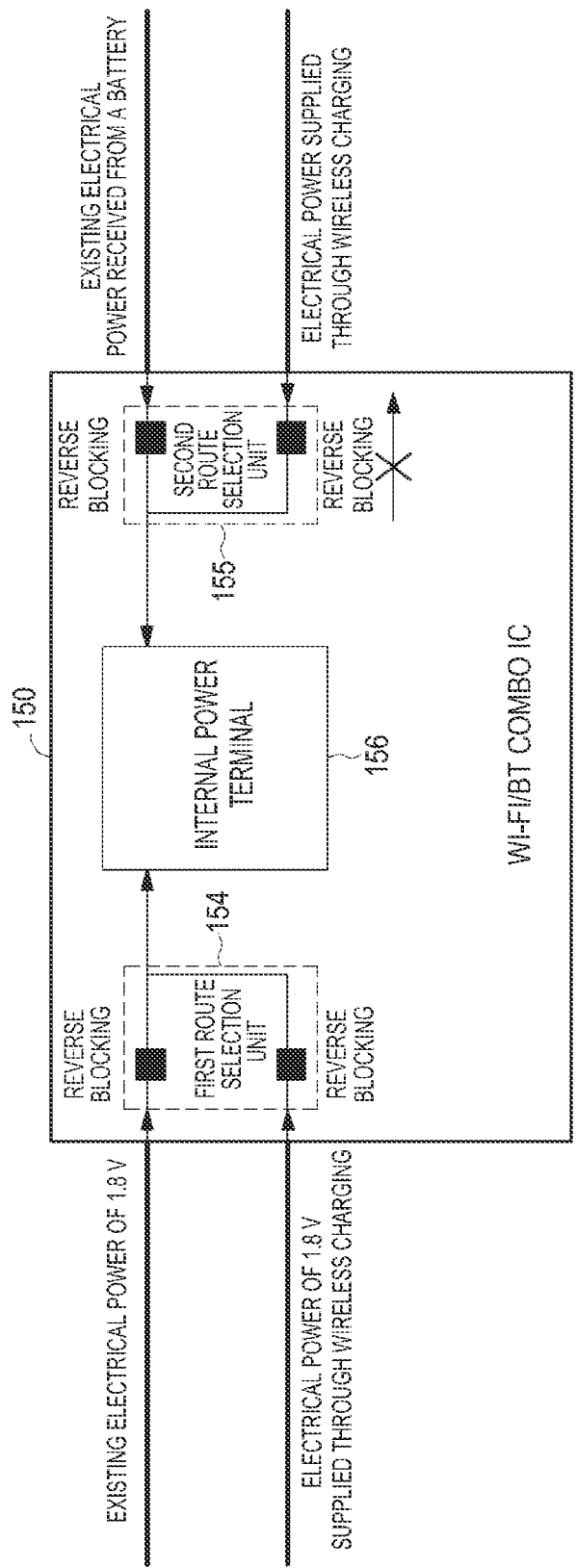
FIG. 4 is a diagram illustrating a structure of a Wi-Fi/Bluetooth combo IC according to an embodiment of the present invention.

Hereinafter, an embodiment of the present invention is described with reference to FIGS. 3 and 4. FIG. 4 is a diagram illustrating a structure of a Wi-Fi/BT combo IC illustrated in FIG. 3. Referring to FIG. 4, due to the structure of Wi-Fi/BT combo IC 150, the terminal 100 is able to wake up the Wi-Fi/BT combo IC 150 during wireless charging, even in a situation where a battery of a device that includes the Wi-Fi/BT combo IC 150 is dead. The dead battery situation indicates a state in which the battery 300 of the terminal 100 is completely discharged so that the terminal 100 is powered off. Therefore, the above-described embodiment of the present invention provides a Wi-Fi/BT combo IC 150 that can perform wireless charging even in the state in which the terminal 100 is powered off.

Referring to FIG. 4, a first route selection unit 154 and a second route selection unit 155 are connected to an internal power terminal 156 of the Wi-Fi/BT combo IC 150. Here, a combination of the first and second route selection units 154 and 155 may form a switching circuit that is controlled by the MCU 153 within the Wi-Fi/BT combo IC 150 through a control line. A combination of the first and second route selection units 154 and 155 may also be referred to as a reverse blocking circuit. The internal power terminal 156 switches external input power on/off, and thereby is able to select at least one of an existing power of 1.8 V from the PMIC 120, existing power received from a battery, power supplied through wireless charging, and power of 1.8 V supplied from the WPT power IC 130 through wireless charging, according to various situations. The internal power terminal 156 is a power block that receives power and supplies the power to the respective elements within the Wi-Fi/BT combo IC 150, and receives the power provided via any one of the first and second route selection units 154 and 155.

The first route selection unit 154 performs a selection such that any one of a first power input according to wired charging and a second power input according to wireless charging is input to the internal power terminal 156 under the control of the MCU 153.

The second route selection unit 155 performs a selection such that any one of a third power input from the battery and a fourth power input according to wireless charging is input to the internal power terminal 156 under the control of the MCU 153.

The power block (i.e., the internal power terminal 156) receives power from any one of the first and second route selection units 154 and 155, and supplies the power to the respective elements within the Wi-Fi/BT combo IC 150. For example, when only the existing power (the existing power of 1.8 V or the existing power received from the battery) is supplied, the first route selection unit 154 may allow the existing power to be input to the internal power terminal 156 by control signaling from the Wi-Fi/BT combo IC 150. When both the existing power and the wireless charging power (the power of 1.8 V supplied through the wireless charging or the power supplied through the wireless charging) are supplied, the internal power terminal 156 may preferentially receive an input of the existing power. Further, when only the wireless charging power but not the existing power is supplied, the internal power terminal 156 may receive the wireless charging power to use the same as an input.

As another example, when the existing power is supplied, the internal power terminal 156 may use the existing power as an input. When both the existing power and the wireless charging power are supplied, the second route selection unit 155 may allow the wireless charging power to be preferentially input to the internal power terminal 156 by control signaling from the Wi-Fi/BT combo IC 150. Further, when only the wireless charging power but not the existing power is supplied, the internal power terminal 156 may receive the wireless charging power to use the same as an input. The power supplied through the internal power terminal 156 as described above is supplied to the respective elements within the Wi-Fi/BT combo IC 150, and the Wi-Fi/BT combo IC 150 is supplied with the power to perform wireless network communication or contactless near field wireless communication.

Figure 5:
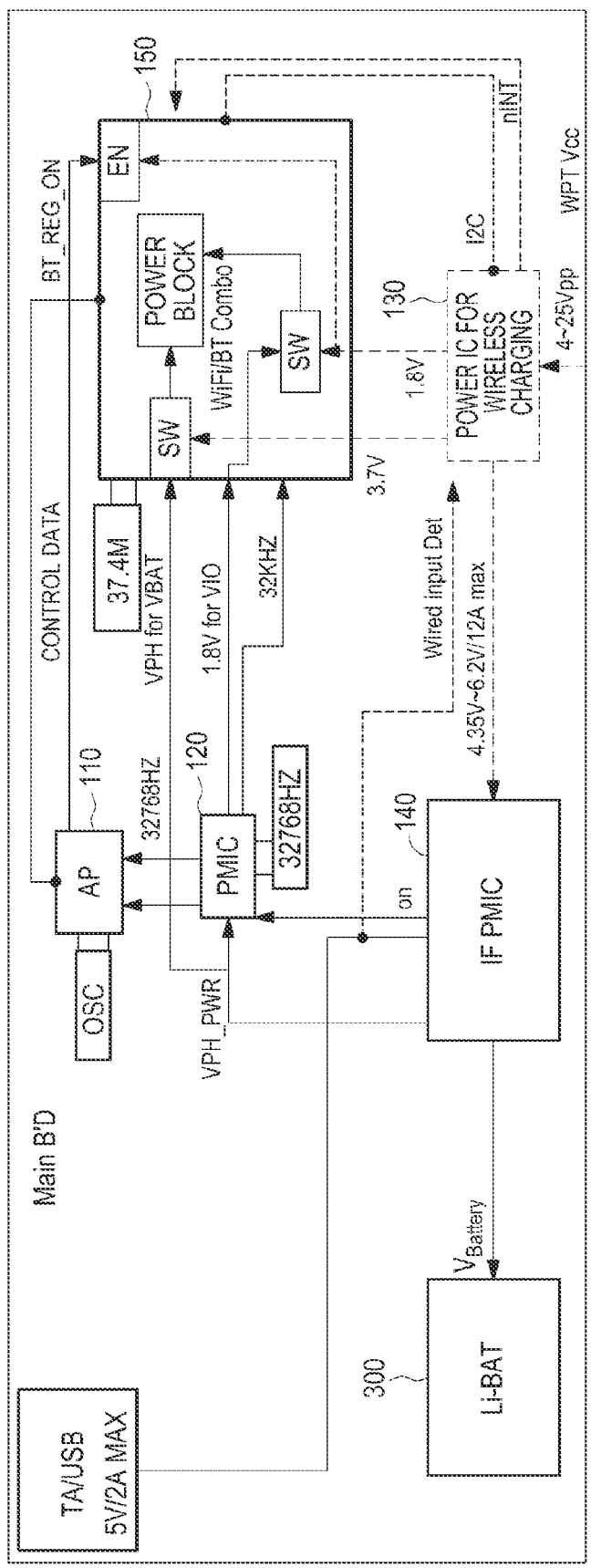
FIG. 5 is a diagram illustrating a configuration of an internal circuit of a wireless power receiver according to an embodiment of the present invention.

FIG. 5 is a diagram illustrating a configuration of an internal circuit of a power receiver according to an embodiment of the present invention.

Figure 6:
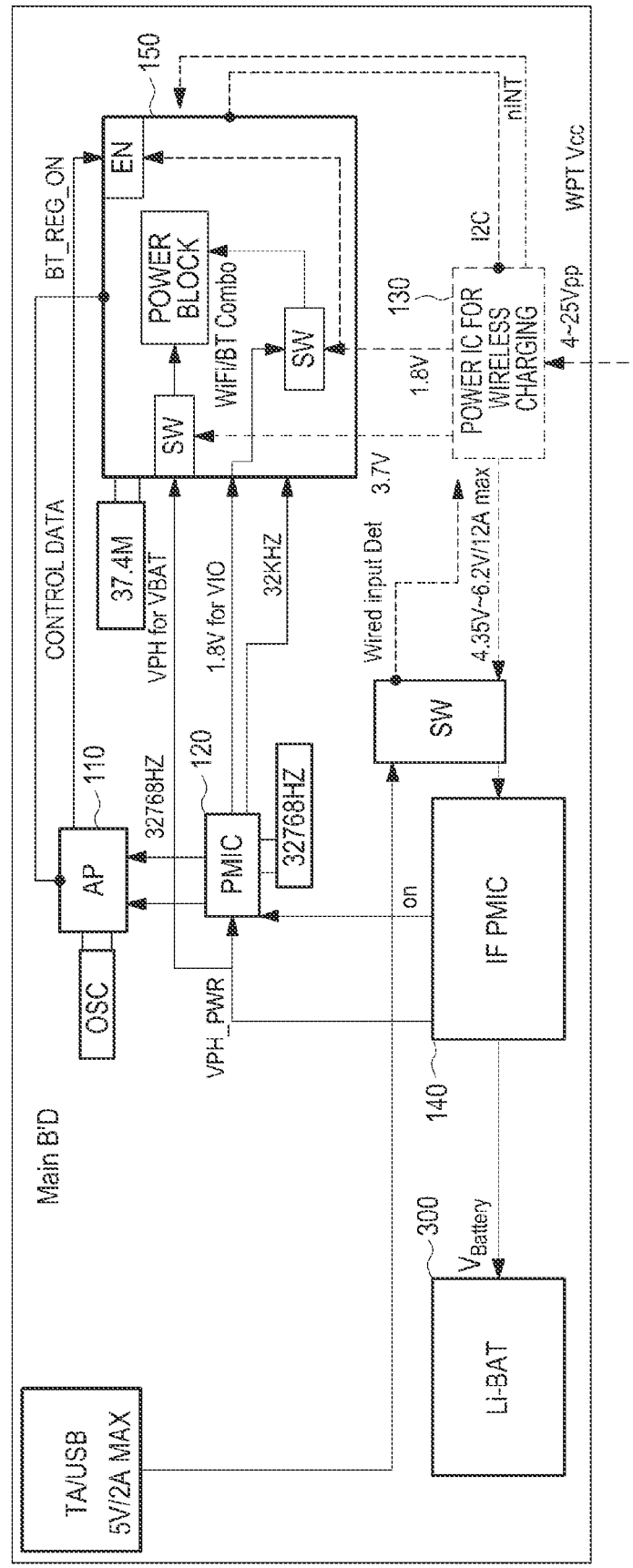
FIG. 6 is a diagram illustrating a configuration of an internal circuit of a wireless power receiver according to another embodiment of the present invention.
Figure 7:
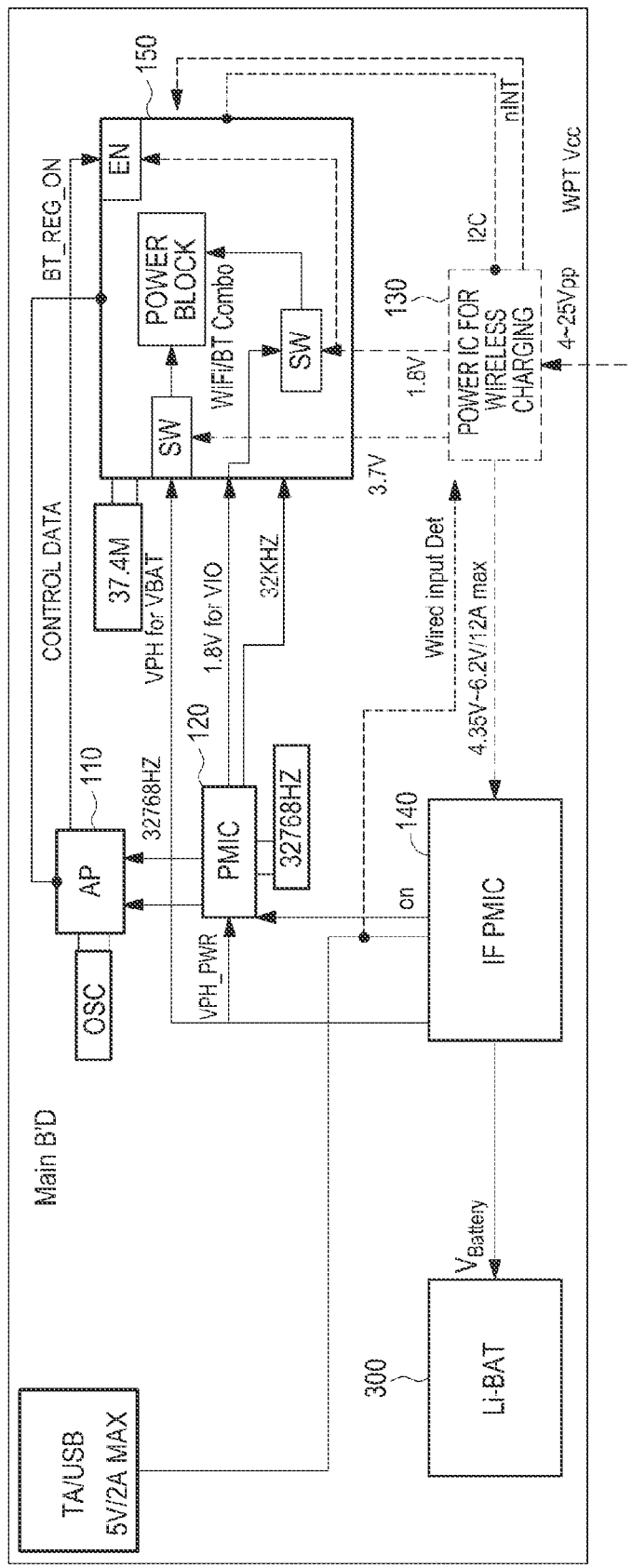
FIG. 7 is a diagram illustrating a configuration of an internal circuit of a wireless power receiver according to another embodiment of the present invention.

FIG. 5 illustrates a connection relation between respective elements and input signals. Although the internal circuit of the power receiver may be configured as illustrated in FIG. 5, the internal circuit may also be configured as illustrated in FIGS. 6 and 7. FIG. 6 is a diagram illustrating a configuration of an internal circuit of a power receiver according to another embodiment of the present invention, and FIG. 7 is a diagram illustrating a configuration of an internal circuit of a power receiver according to further another embodiment of the present invention. Elements in FIGS. 5 to 7 that perform the same functions as corresponding elements in FIG. 3, are denoted by the same reference numerals.

Power input terminals of a Wi-Fi/BT combo IC 150 may be divided into two types, i.e., a power input terminal for wired charging and a power input terminal for wireless charging. Switching between the two power input terminals may exert a large influence on power efficiency of the wireless power receiver. Accordingly, the switching between the two power input terminals may be performed based on the following table. Table 1 corresponds to an example of a VIO 1.8 V power switching table.

TABLE 1

| From PMIC | From Power IC for wireless charging | Input power source of Power block within Combo |
|---|---|---|
| L | L | COMBO IC OFF |
| L | H | POWER IC FOR WIRELESS |

TABLE 1-continued

| From PMIC | From Power IC for wireless charging | Input power source of Power block within Combo |
|---|---|---|
| H | H | CHARGING FROM WIRELESS POWER IC |
| H | L | VIO FROM PMIC |

Referring to Table 1 above, when a low ('L') signal is input from a PMIC 120 and an 'L' signal is input from a power IC 130 for wireless charging, there is no input for wired charging and wireless charging. Thus, the combo IC, i.e., the Wi-Fi/BT combo IC 150 is maintained in an Off state. Meanwhile, when an 'L' signal is input from the PMIC 120 and a high ('H') signal is input from the power IC 130 for wireless charging, there is a power input for wireless charging. Thus, the Wi-Fi/BT combo IC 150 receives power from the power IC 130 for wireless charging.

Further, when an 'H' signal is input from the PMIC 120 and an 'H' signal is input from the power IC 130 for wireless charging, there are both a power input for wired charging and a power input for wireless charging. In this case, the Wi-Fi/BT combo IC 150 receives power from the PMIC 120 since the wired charging is stable. Moreover, when an 'H' signal is input from the PMIC 120 and an 'L' signal is input from the power IC 130 for wireless charging, there is only a power input for wired charging. Thus, the Wi-Fi/BT combo IC 150 receives power from the PMIC 120.

Meanwhile, Table 2 corresponds to an example of a VBATT power switching table.

TABLE 2

| From Battery | 3.3 V From Power IC for wireless charging | Input power source of Power block within Combo |
|---|---|---|
| L | L | COMBO IC OFF |
| L | H | FROM WIRELESS POWER IC |
| H | H | VBATT FROM BATTERY |
| H | L | VBATT FROM BATTERY |

Table 2 is different from Table 1 in that power (VBATT) is input from a battery 300 but not from the PMIC 120 in a case in which an 'H' signal is input from the battery 300 and an 'H' signal is input from the power IC 130 for wireless charging, and in a case in which an 'H' signal is input from the battery 300 and an 'L' signal is input from the power IC 130 for wireless charging.

As described above, if the power of 1.8 V is supplied from the power IC 130 for wireless charging to the Wi-Fi/BT combo IC 150, a BLE function within the Wi-Fi/BT combo IC 150 automatically starts.

An operation of the internal circuit of the wireless power receiver of FIGS. 5 to 7 according to the wired and/or wireless charging is described as follows.

Figure 8:
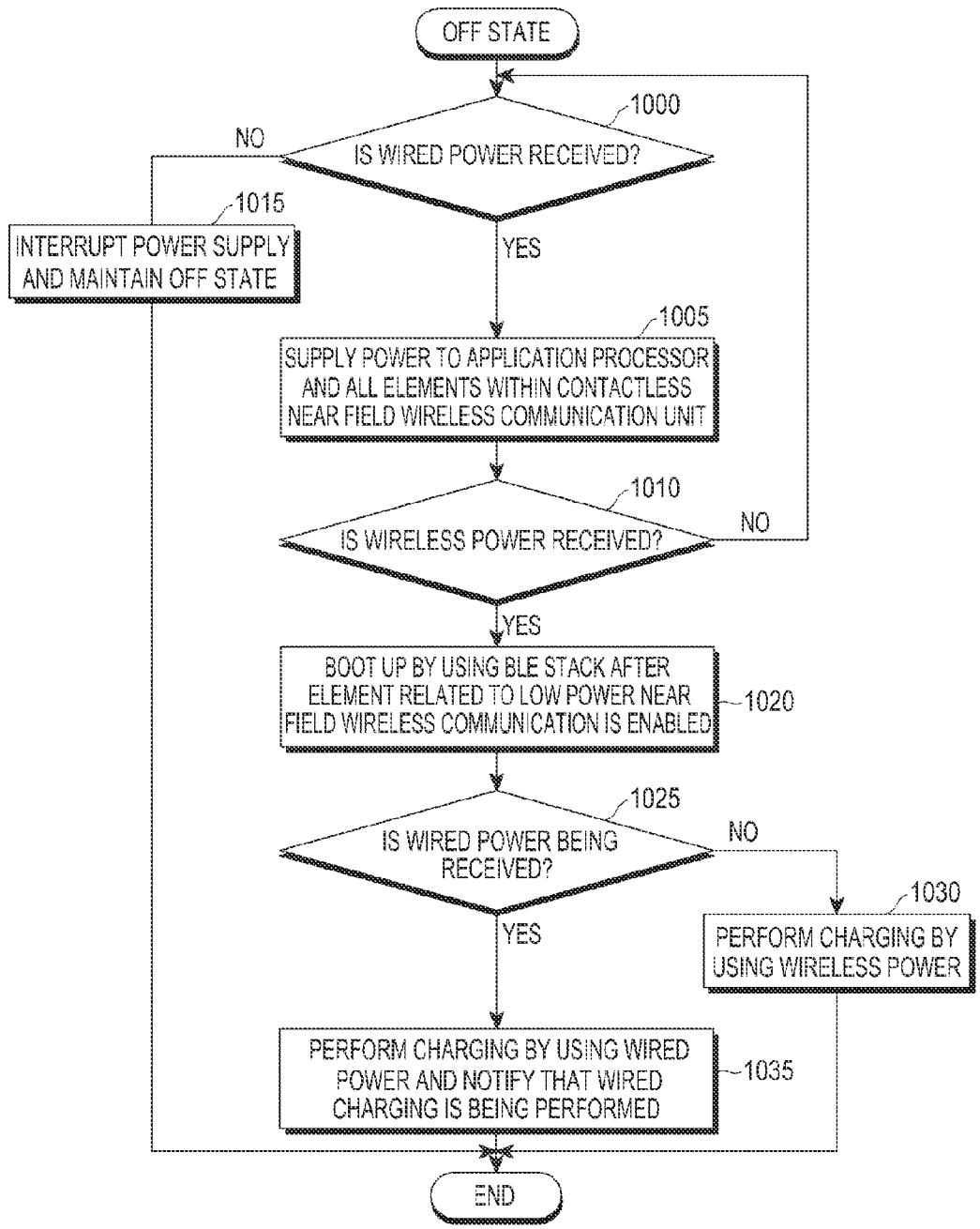
FIG. 8 is a flowchart illustrating an operation in accordance with wired charging and a wireless charging input during the wired charging in a state where a wireless power receiver is turned off, according to an embodiment of the present invention.

FIG. 8 is a flowchart illustrating an operation in accordance with wired charging and a wireless charging input during the wired charging while a wireless power receiver is turned off, according to an embodiment of the present invention.

Referring to FIG. 8, when reception of wired power is detected in step 1000 in a state where the wireless power receiver is turned off, the power is supplied to all elements including an AP 110 in step 1005. For example, the wireless power receiver may be connected with a wired charging terminal through an external device connection unit such as a charging connection jack of the wireless power receiver. When a wired charger is connected to the wireless power receiver as described above, an IF PMIC 140 of FIG. 5 detects a wired connection to transmit an On signal to a PMIC 120, and supplies power of $V_{Battery}$ and power of VPH_PWR to the battery 300 and the PMIC 120, respectively, for power supply to the battery and the entire system. Then, the PMIC 120 supplies the power to a display (not shown) and a clock (not shown) as well as the AP 110 and a Wi-Fi/BT combo IC 150, which require power for a minimum power mode. At this time, 1.8V clock power is used for the Wi-Fi/BT combo IC 150.

Next, the PMIC 120 applies a PWR_RESET to the AP 110. Then, the AP 110 resets peripheral devices while booting up, and initializes General Purpose Input/Output (GPIO). At this time, if a user pushes a hold key to identify a charging state, the AP 110 processes the key input. Accordingly, an icon that indicates the charging state may be displayed on a display unit. At this time, since the wired charging is being performed, the Wi-Fi/BT combo IC 150 for wireless charging is not required to operate. When reception of wireless power is not detected during the wired charging in step 1010, the operation flow returns to step 1000 and a determination of whether the reception of the wired power is continued is performed. If the reception of the wired power is interrupted (e.g., when a user removes the wired charger from the wireless power receiver), power supply to the entire system of the wireless power receiver is interrupted and then the wireless power receiver is maintained in an Off state, in step 1015.

However, when there is a determination that the wireless power is received in step 1010 (e.g., when a user puts the wireless power receiver on a wireless charging pad while the wired charging terminal is connected to the wireless power receiver), a power of 1.8 V is applied from a power IC 130 to the Wi-Fi/BT combo IC 150. Accordingly, in step 1020, elements related to low power near field wireless communication (i.e., the Wi-Fi/BT combo IC 150) is enabled and boots up by using a BLE stack (not shown) within the Wi-Fi/BT combo IC 150. At this time, the power IC 130 may identify that the wired charging is being performed, by receiving a wired charging detection signal by a TA-DET pin (not shown) from a TA-USB. Accordingly, the power IC 130 sets continuation of the wired charging in an internal register and sends a start signal INT to an MCU 153.

The Wi-Fi/BT combo IC 150 may ascertain a situation of the power IC 130 through I2C communication, and before starting the wireless charging, a determination is performed as to whether the wired charging is being performed, in step 1025.

If the wired charging is interrupted, charging is performed by using wireless power, in step 1030. Specifically, if a connection for the wired charging is lost, a TA-DET pin of the power IC 130 becomes 'L' to thereby generate a start signal INT. Then, the Wi-Fi/BT combo IC 150 ascertains a situation within the power IC 130 and informs a wireless power transmitter of the situation. Accordingly, the wireless power transmitter increases the power transmitted to the wireless power receiver and then issues a charge command CHARGER ENable (EN). Then, the Wi-Fi/BT combo IC 150 of the wireless power receiver allows the power IC 130 to transmit the power to the IF PMIC 140. More specifically, the power is transmitted to the IF PMIC 140 in order to charge the battery 300.

However, after a determination in step 1025 that the wired power is being received (i.e., the Wi-Fi/BT combo IC 150 is simultaneously performing the wired and wireless charging), in step 1035, a power switch that allows the power to be supplied through the wired charging is selected and used, and the wireless power receiver may communicate with the wireless power transmitter to inform the wireless power transmitter that the wired charging is being performed. Namely, a first interrupter 151 may be switched on/off such that the power supplied through the wired charging is selected. Accordingly, the IF PMIC 140 supplies the power to all the elements within the wireless power receiver so that the wired charging may be performed.

The wireless power transmitter may output an indication that the wired charging is being performed on the wireless charging pad. The wireless power transmitter may reduce the power transmitted to the wireless power receiver. The wireless power transmitter may also operate in a standby state without transmitting the power for a predetermined period of time until wireless charging with the wireless power receiver is restarted.

Figure 9:
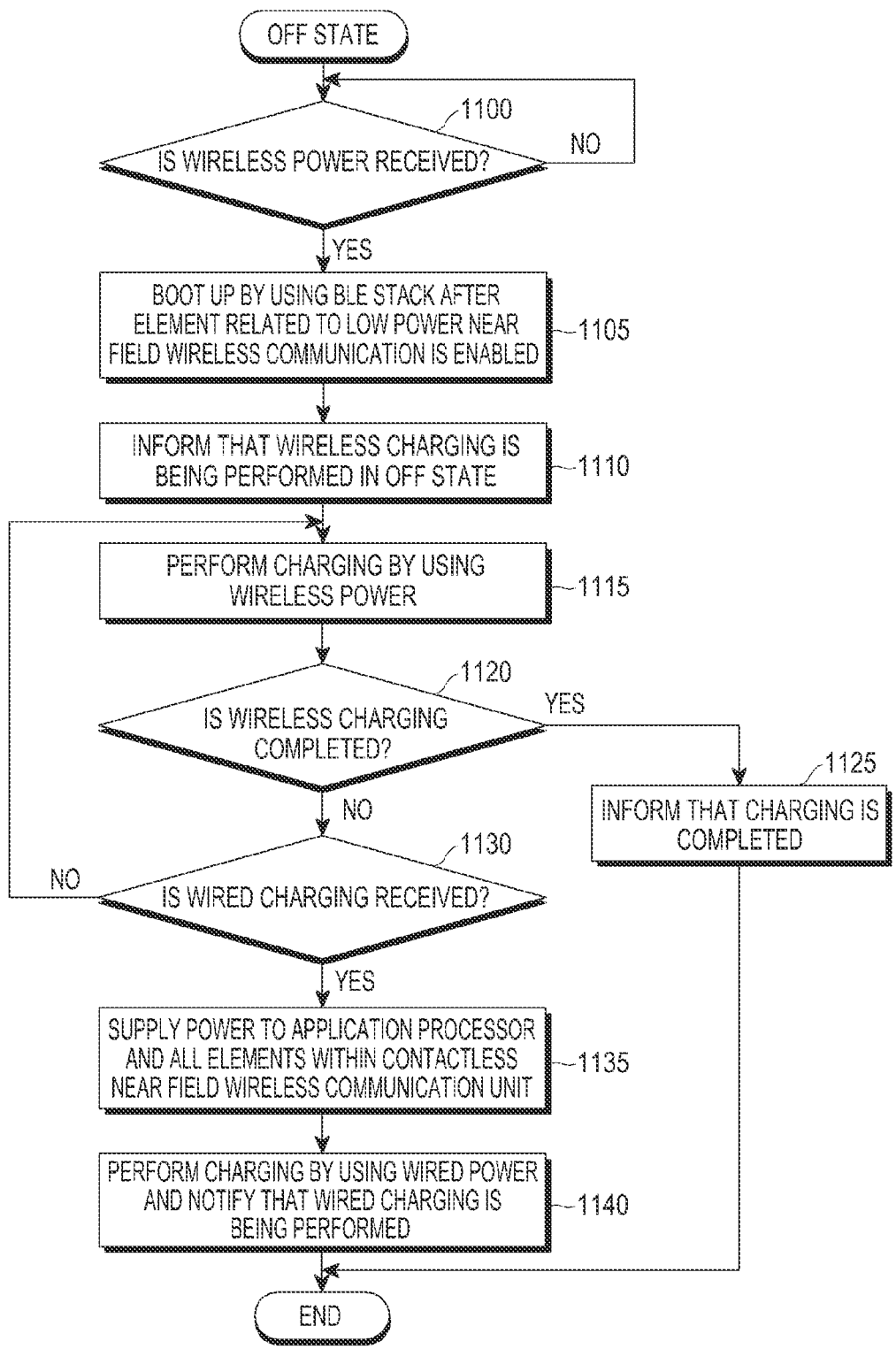
FIG. 9 is a flowchart illustrating an operation in accordance with wireless charging and a wired charging input during the wireless charging in a state where a wireless power receiver is turned off, according to an embodiment of the present invention.

FIG. 9 is a flowchart illustrating an operation in accordance with wireless charging and a wired charging input during the wireless charging in a state where a wireless power receiver is turned off, according to an embodiment of the present invention.

Referring to FIG. 9, when reception of wireless power is detected in a state where the wireless power receiver is turned off in step 1100, an element related to low power near field wireless communication (i.e., a Wi-Fi/BT combo IC 150) is enabled and then boots up by using a BLE stack, in step 1105. Specifically, when the power reception for wireless charging is detected, a power IC 130 supplies power of 1.8 V to the Wi-Fi/BT combo IC 150 and the Wi-Fi/BT combo IC 150 is then enabled by itself, so as to operate a crystal of 37.4 MHz, and boots up by using the BLE stack. Since the power of 1.8 V is not applied from a PMIC 120 to a VIO of the Wi-Fi/BT combo IC 150, the Wi-Fi/BT combo IC 150 ascertains that the wireless charging is being performed in the Off state, and in step 1110, notifies a wireless power transmitter that the wireless charging is being performed in the Off state.

When a charge command is received from the wireless power transmitter in response to the notification, the Wi-Fi/BT combo IC 150 performs charging by using the wireless power in step 1115. Specifically, the Wi-Fi/BT combo IC 150 activates a CHARGER_EN pin (not shown) and allows the wireless charging power IC 130 to transmit the power to an IF PMIC 140. More specifically, the power is transmitted to the IF PMIC 140 for charging of a battery 300. The IF PMIC 140 supplied with the power transfers an On signal to the PMIC 120, and supplies power of VBattery and power of VPH_PWR for power supply to the battery and the entire system. Then, the PMIC 120 starts to operate as the On signal is transferred, and supplies the power to a display and a clock as well as an AP 110 and the Wi-Fi/BT combo IC 150.

The AP 110 preferentially resets peripheral ICs and then initializes GPIO in a boot-up step. The Wi-Fi/BT combo IC 150 may be reset by a signal such as BT_REG_ON, WL_REG_ON, etc., which are transferred from the AP 110. When the VIO of the Wi-Fi/BT combo IC 150 receives power of 1.8 V from the PMIC 120, an internal SWitch (SW) MUltipleXer (MUX) circuit uses the power of the PMIC 120. Here, although the signal BT_REG_ON from the AP 110 represents an 'L' state, the Wi-Fi/BT combo IC 150 operates by using the power of 1.8 V transferred from the power IC 130.

Next, in step 1120, the Wi-Fi/BT combo IC 150 determines whether the wireless charging is completed. If the wireless charging is completed, the Wi-Fi/BT combo IC 150 informs the wireless power transmitter of the completion of charging, in step 1125. Specifically, if the Wi-Fi/BT combo IC 150 monitors a small amount of current exiting from the power IC 130 at the time of buffering, the Wi-Fi/BT combo IC 150 informs the wireless power transmitter of the completion of charging. Accordingly, the wireless power transmitter may display the completion of charging on a wireless charging pad.

Meanwhile, an input for wired charging may be entered during the wireless charging. For example, a user may connect a wired charging terminal to the wireless power receiver that has already been placed on the wireless charging pad.

Accordingly, before the wireless charging is completed in step 1120, a determination is made in step 1130 as to whether reception of wired power is detected during the wireless charging. If the reception of the wired power is not detected, operation flow returns to step 1115 and the wireless charging is performed. However, if the reception of the wired power is detected, the power is supplied to all elements including the AP 1110 in step 1135. More specifically, when an input for the wired charging is entered during the wireless charging, the wired charging is selected and the IF PMIC 140 charges the wireless power receiver by using the wired charging power.

Further, an 'H' signal is detected in TA-DET of the power IC 130 so that a start signal INT is generated, and the Wi-Fi/BT combo IC 150 may ascertain an event situation of the power IC 130 by using the I2C. More specifically, referring to Table 1 above, since an 'H' signal is detected from the power IC 130 and an 'H' signal according to a wired charging connection is detected from the PMIC 130, an input power source within the Wi-Fi/BT combo IC 150 may be determined as wired charging. Accordingly, in step 1140, the Wi-Fi/BT combo IC 150 performs charging by using the wired power and informs the wireless power transmitter that the wired charging is being performed. Next, the Wi-Fi/BT combo IC 150 deactivates the CHARGER_EN pin of the power IC 130.

The wireless power transmitter outputs an indication that the wired charging is being performed on the wireless charging pad. Then, the wireless power transmitter reduces the power transmitted to the wireless power receiver. At this time, if a user stops the wired charging, an 'L' signal is detected in the TA-DET of the power IC 130 so that a start signal INT is generated, and the Wi-Fi/BT combo IC 150 may grasp, by using the I2C, that the event situation of the power IC 130 indicates the interruption of the wired charging. Accordingly, the Wi-Fi/BT combo IC 150 requests the wireless power transmitter to increase the transmitting power again. More specifically, when the wired charging is interrupted, the Wi-Fi/BT combo IC 150 makes the request to the wireless power transmitter, in order for charging to continue via wireless charging.

As described above, when the wireless charging, the wired charging, the wired charging during the wireless charging, or the wireless charging during the wired charging is performed while the wireless power receiver is turned off, the Wi-Fi/BT combo IC 150 does not operate, or operates based on the BLE stack of the internal memory thereof to thereby operate in a Stand Alone (SA) mode. More specifically, when there is not enough power to wake up the application processor or an input through a power button is not entered, so that the wireless power receiver is maintained in the Off state, the Wi-Fi/BT combo IC 150 may not be supplied with a full stack from the AP 110 and therefore may not operate in a Non-Stand Alone (NSA) mode. The NSA mode is an operation mode based on the loaded stack by loading to the memory within Wi-Fi/BT combo IC 150 by inputting the stack, which is the communication method for the wireless charging from AP 110.

However, when the wireless charging, the wired charging, the wired charging during the wireless charging, or the wireless charging during the wired charging is performed while the wireless power receiver is turned on, a mode change between the SA mode and the NSA mode is made. Accordingly, the Wi-Fi/BT combo IC 150 may operate based on the BLE stack of the internal memory thereof, or may also receive an input of the full stack from the AP 110 to operate based on the full stack from the AP 110.

An operation of internal circuit elements of a wireless power receiver when the wireless power receiver is turned on is described as follows with reference to FIG. 10.

Figure 10:
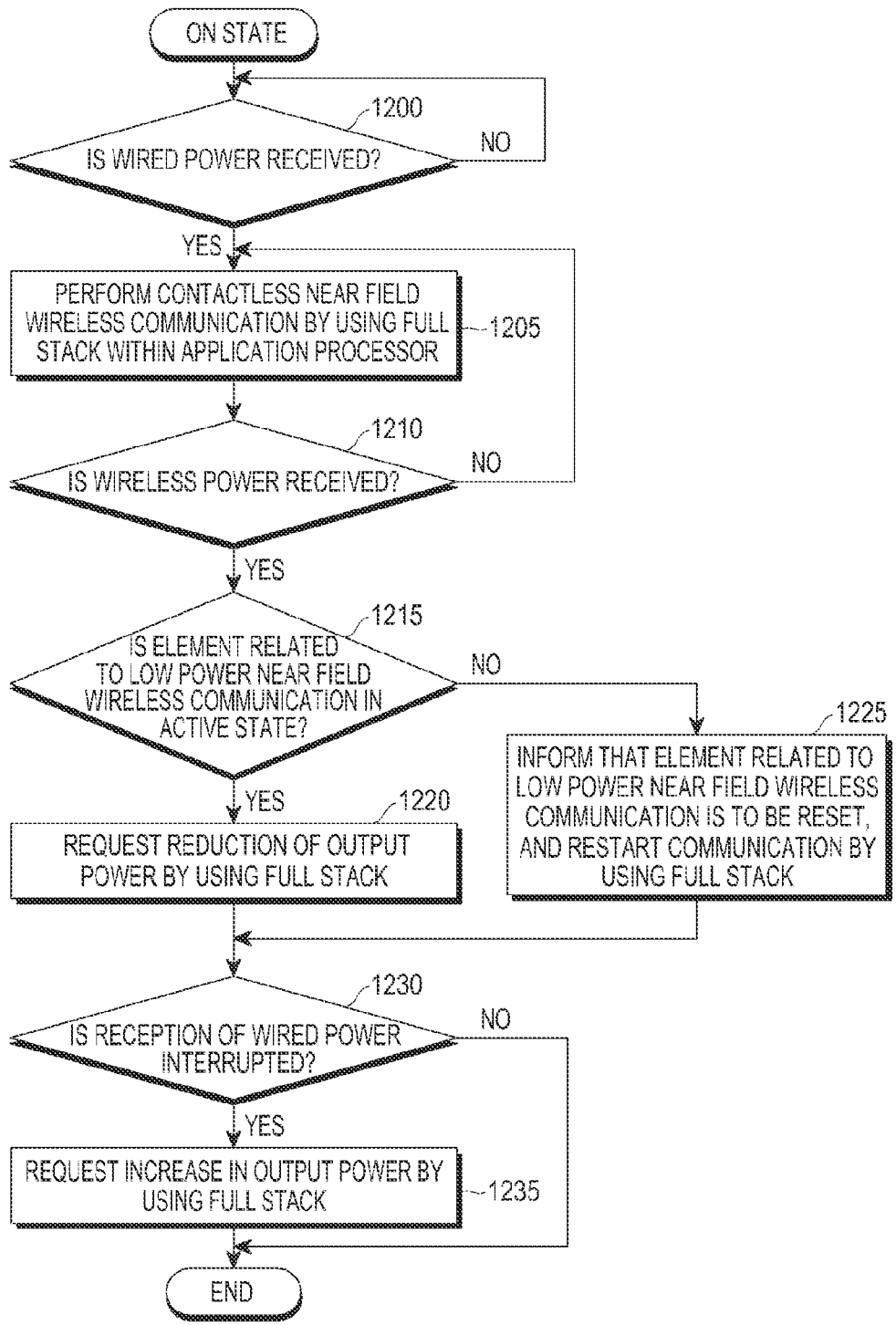
FIG. 10 is a flowchart illustrating an operation in accordance with wired charging and a wireless charging input during the wired charging in a state where a wireless power receiver is turned on, according to an embodiment of the present invention.

FIG. 10 is a flowchart illustrating an operation in accordance with wired charging and a wireless charging input during the wired charging in a state where a wireless power receiver is turned on, according to an embodiment of the present invention.

Referring to FIG. 10, in step 1200, reception of wired power is monitored while the wireless power receiver is turned on. For example, when a user inserts a wired charging terminal into a charging terminal of the wireless power receiver for wired charging, the wired power is received. Specifically, an IF PMIC 140 transmits an On signal to a PMIC 120, and supplies power of VBattery and power of VPH_PWR for power supply to a battery and the entire system. Accordingly, an AP 110 ascertains that the wired charging is being performed, and controls display of a charging icon. At this time, the AP 110 transfers an 'L' signal to a Wi-Fi/BT combo IC 150 by BT_REG_ON. Then, as illustrated in Table 2, the Wi-Fi/BT combo IC 150 does not operate based on the 'L' signal output from a battery 300 through the AP 110 and an 'L' signal from a power IC 130, which indicates that there is no connection for wireless charging.

Thereafter, when communicating with the Wi-Fi/BT combo IC 150, the AP 110 outputs an 'H' signal by BT_WAKE and transfers the 'H' signal to the Wi-Fi/BT combo IC 150 by the BT_REG_ON, in order to wake up the circuit unit performing contactless near field wireless communication. Then, the Wi-Fi/BT combo IC 150 starts to operate, and transfers an 'H' signal to the AP 110 by BT_HOST_WAKE to communicate with the AP 110 through UART. When the Wi-Fi/BT combo IC 150 wakes up in the manner described above, the Wi-Fi/BT combo IC 150 is used through communication with a BT ear set and a BT product. Otherwise, when communication is not performed for a long period of time, the AP 110 outputs an 'L' signal by the BT_WAKE, and the Wi-Fi/BT combo IC 150 then shifts to a sleep state. At this time, the Wi-Fi/BT combo IC 150 receives, for example, a BT 4.0 full stack from the AP 110 to load the same into a RAM, and communicates with the wireless power transmitter based on the full stack.

Meanwhile, an input for wireless charging may be entered during the wired charging. For example, a user may put the wireless power receiver on a wireless charging pad, while a wired charging terminal is connected to the wireless power receiver.

Accordingly, before the wired charging is completed, a determination is made in step 1210 as to whether reception of wireless power is detected during the wired charging. If the reception of the wireless power is detected, the IF PMIC 140 charges the wireless power receiver by using the wired charging power.

At this time, a determination is made in step 1215 as to whether the element related to low power near field wireless communication, i.e., the Wi-Fi/BT combo IC 150 is in an active state. Namely, it is determined whether the AP 110 has transferred an 'H' signal to the Wi-Fi/BT combo IC 150 by BT_REG_ON.

If the Wi-Fi/BT combo IC 150 is in the active state, the Wi-Fi/BT combo IC 150 has already been booted up based on the a full stack, and the AP 110 controls the Wi-Fi/BT combo IC 150 for communication with an external device (e.g., a BT ear set, a wireless charging pad, etc.) and communicates with the external device. Accordingly, when charging through the wired power, the Wi-Fi/BT combo IC 150 requests reduction of output power from the wireless power transmitter by using the full stack, in step 1220.

Specifically, when the wireless power is received, the power IC 130 transmits power of 1.8 V/3.7 V to the Wi-Fi/BT combo IC 150 and an 'H' signal is output by TA_DET, so that a start signal INT is transferred to the Wi-Fi/BT combo IC 150. When the power of 1.8 V or the start signal INT is input, the Wi-Fi/BT combo IC 150 ascertains the situation of the power IC 130 through the I2C, and thus ascertains that the wired and wireless chargings are being simultaneously performed. Accordingly, since the wired and wireless chargings are being simultaneously performed, the Wi-Fi/BT combo IC 150 requests an adjustment of the power during communication with the wireless power transmitter. Here, the Wi-Fi/BT combo IC 150 can communicate with the wireless power transmitter as well as a BT ear set, by using a single antenna through time division.

However, when the reception of the wired power is interrupted in step 1230, the Wi-Fi/BT combo IC 150 requests an increase in the output power from the wireless power transmitter, by using the full stack in step 1235. Specifically, when the wired charging terminal is removed from the wireless power receiver, the power IC 130 detects an 'L' signal by a TA_DET pin and transmits a start signal INT to the Wi-Fi/BT combo IC 150. Then, the Wi-Fi/BT combo IC 150 recognizes an event situation of the power IC 130 in a state where 1.8 V according to the wireless charging is input, and may request the wireless power transmitter to increase the transmitting power. When the wireless power transmitter increases the transmitting power in response to the request, the Wi-Fi/BT combo IC 150 enables a buck output of the power IC 130 to transmit the power to the IF PMIC 140, and the IF PMIC 140 charges the battery.

However, after a determination in step 1215 that the element related to the low power near field wireless communication (i.e., the Wi-Fi/BT combo IC 150) is not in the active state (more specifically, if the AP 110 does not transfer an 'H' signal to the Wi-Fi/BT combo IC 150 by BT_REG_ON), a signal by BT_REG_ON is always an 'L' signal.

Accordingly, the Wi-Fi/BT combo IC 150 is enabled by itself, by detecting power of 1.8 V corresponding to the wireless charging in an initial stage of receiving the power from the power IC 130, and boots up by using the BLE stack. Specifically, when the wireless power is received, the power IC 130 starts to operate. The power IC 130 transmits power of 1.8 V/3.7 V and at the same time, ascertains that the signal by the TA_DET pin is an 'H' signal, to transmit a start signal INT to the Wi-Fi/BT combo IC 150. Then, the Wi-Fi/BT combo IC 150 boots up by detecting the 1.8 V output of the power IC 130 and operating a crystal of 37.4 MHz, and accesses the power IC 130 by using the I2C to ascertain the situation.

Next, the Wi-Fi/BT combo IC 150 informs the AP 110 that the wireless charging is being performed, and the AP 110 activates a BT function. Meanwhile, when the wireless charging is completed (more specifically, when a user removes the wireless power receiver from the wireless charging pad), the Wi-Fi/BT combo IC 150 is disabled. However, when the Wi-Fi/BT combo IC 150 informs the AP 110 that the wireless charging is being performed, the AP 110 recognizes that the wired and wireless chargings are simultaneously applied, informs the wireless power transmitter that the wired and wireless chargings are simultaneously applied, and activates the BT function to request an adjustment of the power. To this end, the AP 110 transmits an 'H' signal to the Wi-Fi/BT combo IC 150 by BT_REG_ON.

Then, in step 1225, the Wi-Fi/BT combo IC 150 informs the wireless power transmitter that the Wi-Fi/BT combo IC 150 is to be reset, and thereafter restarts communication by using the full stack. Specifically, since the Wi-Fi/BT combo IC 150 will be reset, the wireless power transmitter is requested to maintain the power transmission, even if communication is lost for a predetermined period of time (e.g., 2 seconds). A response to maintain the power transmission may be received from the wireless power transmitter in response to the request, and the Wi-Fi/BT combo IC 150 receives the full stack from the AP 110 after being reset and restarts communication with the wireless power transmitter based on the full stack, thereby maintaining the wireless charging. When the wireless charging is input during the wired charging, the AP 110 selects the wired charging, but may maintain the wireless charging, uninterrupted. However, after a determination that the reception of the wired power is interrupted in step 1230 after the wireless charging is input, the AP 110 requests an increase in the output power by using the full stack, in step 1235.

Figure 11:
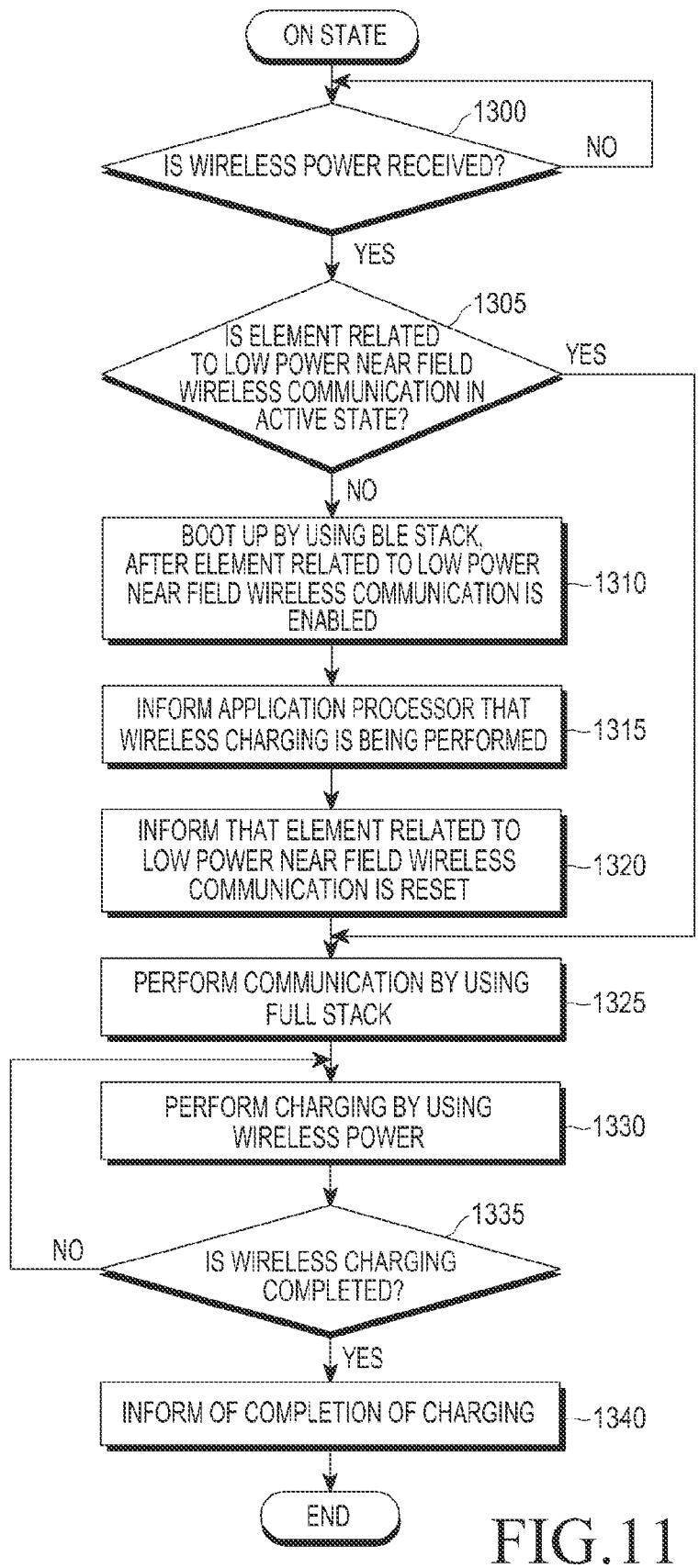
FIG. 11 is a flowchart illustrating an operation in accordance with wireless charging in a state where a wireless power receiver is turned on, according to an embodiment of the present invention.

FIG. 11 is a flowchart illustrating an operation in accordance with wireless charging in a state where a wireless power receiver is turned on, according to an embodiment of the present invention.

Referring to FIG. 11, reception of wireless power is monitored in step 1300 while the wireless power receiver is turned on. For example, when a user puts the wireless power receiver on a wireless charging pad for wireless charging, wireless power may be received. At this time, since the wireless power receiver is in an On state, a Wi-Fi/BT combo IC 150 is supplied with power of 1.8 V from a battery 300 through a PMIC 120.

If the reception of the wireless power is detected, a determination is made in step 1305 as to whether an element related to low power near field wireless communication (i.e., the Wi-Fi/BT combo IC 150) is in an active state. If the Wi-Fi/BT combo IC 150 is not in an active state, namely, a signal from an AP 110 by BT_REG_ON is an 'L' signal and power of 1.8 V is detected from a power IC 130, the Wi-Fi/BT combo IC 150 is enabled by itself and boots up by using a BLE stack in step 1310. Then, the Wi-Fi/BT combo IC 150 activates CHARGER_EN of the power IC 130, after communicating with a wireless power transmitter, thereby controlling transmission of power to an IF PMIC 140. The IF PMIC 140 accordingly supplied with the power transfers an On signal to the PMIC 120, and supplies power of VBattery and power of VPH_PWR for power supply to a battery and the entire system, thereby performing the wireless charging.

Further, as the On signal is transferred, the PMIC 120 informs the AP 110 that the wireless charging is being performed, in step 1315. Then, the AP 110 may ascertain that the wireless charging is being performed, and transmits an 'H' signal by BT_REG_ON to activate BT. In response to transmission of the 'H' signal, in step 1320, the Wi-Fi/BT combo IC 150 reports to the wireless power transmitter that the Wi-Fi/BT combo IC 150 is to be reset. This report serves to request the wireless power transmitter to maintain the power for a predetermined period of time (e.g., 2 seconds), even if communication are lost, since the Wi-Fi/BT combo IC 150 itself will be reset. The Wi-Fi/BT combo IC 150 restarts communication with the wireless power transmitter by using the full stack in step 1325 after being reset, and continuously performs the wireless charging in step 1330. Next, in step 1335, a determination of whether the wireless charging is completed is performed. To this end, the Wi-Fi/BT combo IC 150 determine whether the wireless charging is completed by monitoring whether a current exiting from the power IC 130 is reduced. After a determination that the wireless charging has been completed, the Wi-Fi/BT combo IC 150 informs the wireless power transmitter of the completion of the charging in step 1340.

However, if the Wi-Fi/BT combo IC 150 is in the active state in step 1305 (i.e., a signal from the AP 110 by BT_REG_ON is an 'H' signal), the Wi-Fi/BT combo IC 150 may have been booted up through the full stack. Since the wireless power has been received in this state, power of 1.8 V/3.7 V is transferred from the power IC 130 to the Wi-Fi/BT combo IC 150. Accordingly, as power of 1.8 V or a start signal INT is input from the power IC 130, the Wi-Fi/BT combo IC 150 may ascertain the situation of the power IC 130 and thus may identify that the wireless charging is being performed.

The Wi-Fi/BT combo IC 150 performs communication with the wireless power transmitter by using the full stack, in step 1325. Next, the Wi-Fi/BT combo IC 150 allows the power IC 130 to transmit the power to the IF PMIC 140, and performs charging by using the wireless power as in step 1330.

Meanwhile, after the Wi-Fi/BT combo IC 150 informs the wireless power transmitter of the completion of the wireless charging, the wireless power transmitter may reduce the power transmitted to the wireless power receiver, or may inform that the wireless charging will be completed. In this case, the Wi-Fi/BT combo IC 150 may inform the AP 110 that the power supply by the wireless power transmitter will be interrupted together with the completion of the charging.

Figure 12:
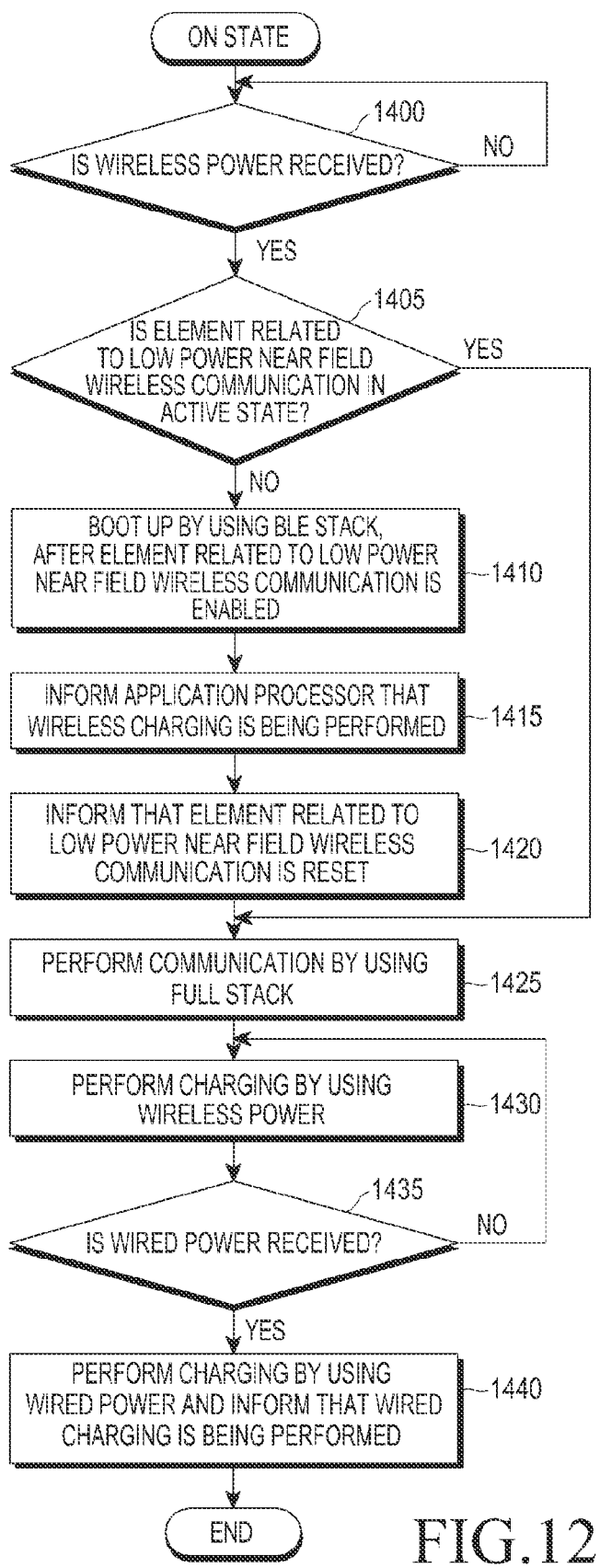
FIG. 12 is a flowchart illustrating an operation in accordance with a wired charging input in a state where a wireless power receiver is turned on, according to an embodiment of the present invention.

FIG. 12 is a flowchart illustrating an operation in accordance with a wired charging input in a state where a wireless power receiver is turned on, according to an embodiment of the present invention.

Referring to FIG. 12, operations in steps 1400 to 1430 are the same as those in steps 1300 to 1330 of FIG. 11, and therefore a further description of these steps is omitted. Meanwhile, in the process of performing charging by using wireless power, in step 1435, a determination is performed as to whether reception of wired power is detected. If the reception of the wired power is detected, a Wi-Fi/BT combo IC 150 performs the charging by using the wired power and informs a wireless power transmitter that the wired charging is being performed, in step 1440. In this way, the Wi-Fi combo IC 150 may request the wireless power transmitter to adjust transmitting power.

The Wi-Fi combo IC 150 operates through a BLE stack in a BT inactive state, namely, while an 'L' signal by BT_REG_ON is transferred. Then, the Wi-Fi combo IC 150 is reset after an 'H' signal by BT_REG_ON is transferred from an AP 110, and may operate by using a full stack. However, since a signal from the AP 110 by BT_REG_ON is an 'H' signal in a BT active state, the Wi-Fi/BT combo IC 150 may have been booted up through the full stack, and thus may operate by using the full stack.

According to the embodiments of the present invention, the existing Wi-Fi/BT combo IC employed for the wireless power receiver performs signaling during wireless charging, so that a space within the wireless power receiver can be saved, manufacturing costs of the wireless power receiver can be reduced, and the wireless power receiver can be wirelessly charged even in the dead battery situation in which the battery of the wireless power receiver is dead so that the wireless power receiver is turned off.

While the invention has been shown and described with reference to certain embodiments thereof, it will be understood by those skilled in the art that various changes in form

What is claimed is:

1. An integrated circuit for wireless charging, comprising:
   a first wireless communication unit configured to support a first wireless communication method;
   a second wireless communication unit configured to support a second wireless communication method;
   a first route selection unit configured to perform a selection from among a first power input according to wired charging and a second power input according to wireless charging to be allowed as input;
   a second route selection unit configured to perform a selection from among a power between a third power input from a battery and a fourth power input according to wireless charging to be allowed as input;
   a power block configured to receive the power from any the first and second route selection units; and
   a controller configured to control an operation of the first and second route selection units.

2. The integrated circuit of claim 1, wherein the first route selection unit allows the first power input according to the wired charging to be transferred to the power block under the control of the controller when the first power is input according to the wired charging.

3. The integrated circuit of claim 1, wherein the first route selection unit allows the first power input according to the wired charging to be transferred to the power block under the control of the controller when the first power is input according to the wired charging and the second power is input according to the wireless charging.

4. The integrated circuit of claim 1, wherein the second route selection unit allows the fourth power input according to the wireless charging to be transferred to the power block under the control of the controller when the third power is input according to the wired charging and the fourth power is input according to the wireless charging.

5. The integrated circuit of claim 1, wherein the first and second route selection units comprise a switch.

6. The integrated circuit of claim 1, wherein each of the first power input according to the wired charging and the second power input according to the wireless charging provides a power input of 1.8 V.

7. The integrated circuit of claim 1, wherein the first wireless communication unit includes a Wi-Fi communication unit.

8. The integrated circuit of claim 1, wherein the second wireless communication unit includes a Bluetooth communication unit and a Bluetooth low energy communication unit.

9. The integrated circuit of claim 4, wherein the integrated circuit determines whether the wired charging or the wireless charging is being performed, by receiving a signal from a power Integrated Circuit (IC) through an Inter-Integrated Circuit (I2C) and an INT interface.

10. A wireless charging method in an integrated circuit for wireless charging, comprising:
    determining whether there is receipt of at least one of a first power input according to wired charging and a second power input according to wireless charging;
    performing a selection to allow supply of the first power input according to the wired charging in response to a determination that the first power is input according to the wired charging and the second power is input according to the wireless charging; and
    performing at least one of wireless network communication and contactless near field wireless communication by receiving the first power input according to the wired charging.

11. The wireless charging method of claim 10, wherein performing the selection comprises performing a switching operation that supplies the first power input according to the wired charging into the integrated circuit.

12. The wireless charging method of claim 10, further comprising:
    performing a selection to allow supply of the second power input according to the wireless charging in response to a determination that the second power is input according to the wireless charging.

13. The wireless charging method of claim 10, further comprising:
    determining whether there is receipt of at least one of a third power input from a battery and a fourth power input according to wireless charging; and
    performing a selection to allow supply of the fourth power input according to the wireless charging in response to a determination that the third power is input according to the wired charging and the fourth power is input according to the wireless charging.

14. The wireless charging method of claim 10, wherein the wireless network communication comprises Wi-Fi communication.

15. The wireless charging method of claim 10, wherein the contactless near field wireless communication comprises Bluetooth communication and Bluetooth low energy communication.

16. The wireless charging method of claim 10, wherein each of the first power input according to the wired charging and the second power input according to the wireless charging provides a power input of 1.8 V.

* * * * *